UNITED STATES PATENT OFFICE.

HENRY WEGMANN, OF NEW YORK, N. Y., ASSIGNOR TO H. WEGMAN & CO., OF SAME PLACE.

IMPROVEMENT IN COMPOUNDS FOR SIZING COTTON-YARN.

Specification forming part of Letters Patent No. 151,326, dated May 26, 1874; application filed April 11, 1874.

*To all whom it may concern:*

Be it known that I, HENRY WEGMANN, of the city, county, and State of New York, have invented a new and Improved Compound for Sizing Cotton-Yarn, of which the following is a specification:

My improved compound consists of tallow, one pound; soft soap, three pounds; rosin, three-quarters of a pound; vitriol of iron, one pound; onions, one-half pound.

This compound is designed to be added to twenty-five or seventy-five pounds starch, or fifty to one hundred pounds flour, the rosin, vitriol, onions, and tallow being boiled till rendered sufficiently liquid to mix freely with the other matters; then the soap is melted in a tank separately, by hot water and steam, and the above mixture added. They are then thoroughly mixed with steam, and then added to the starch or flour in another tank, together with the proportion of water requisite for making the sizing more or less stiff, according to the size of the yarn for which it is intended, the starch or flour being also varied to suit the case in hand.

I do not limit myself to the exact proportions here stated, for they may be varied to some extent without material effect.

Having thus described my invention, I claim as new, and desire to secure by Letters Patent—

A chemical compound for sizing cotton-yarn, composed of the substances herein specified, and prepared substantially in the manner described.

H. WEGMANN.

Witnesses:
   T. B. MOSHER,
   ALEX F. ROBERTS.